(12) United States Patent
Koehler

(10) Patent No.: US 6,182,814 B1
(45) Date of Patent: Feb. 6, 2001

(54) INLINE VACUUM SLUG FEEDER

(75) Inventor: Philip A. Koehler, River Falls, WI (US)

(73) Assignee: SIG Pack, Inc., Doboy Division, New Richmond, WI (US)

( * ) Notice: Under 35 U.S.C. 154(b), the term of this patent shall be extended for 0 days.

(21) Appl. No.: 09/518,331

(22) Filed: Mar. 3, 2000

(51) Int. Cl.[7] .................................................. B65G 47/26
(52) U.S. Cl. ........................... 198/418.7; 53/532; 53/542; 198/419.1; 198/428
(58) Field of Search ................... 53/532, 542; 198/418.7, 198/419.1, 419.3, 426, 428; 414/798.2, 798.4, 798.7

(56) References Cited

U.S. PATENT DOCUMENTS

| | | | |
|---|---|---|---|
| 4,098,392 | 7/1978 | Greene | 198/419.3 |
| 4,611,705 | 9/1986 | Fluck | 198/425 |
| 5,020,655 | 6/1991 | Cruver | 198/419.3 |
| 5,983,701 | 4/1999 | Pruett | 414/798.7 X |

*Primary Examiner*—Janice L. Krizek
(74) *Attorney, Agent, or Firm*—Nikolai, Mersereau & Dietz, P.A.

(57) ABSTRACT

An in line feed method and apparatus for forming slugs of incoming items, which are standing on edge and aligned front-to-back is disclosed. The process uses a conveyor belt and a vacuum chamber aligned end to end for separating the flow of items and creating slugs. The items introduced to the system are on a conveyor belt. The belt is periodically stopped and the items blocked from being sucked into the vacuum chamber. While the product is blocked from entering the vacuum chamber a moving finger which travels through the chamber is introduced at the mouth of the vacuum chamber and the items are released from the conveyor belt such that they are sucked into the vacuum chamber but are limited by and stack up against the finger. In this manner slugs are formed.

15 Claims, 2 Drawing Sheets

INLINE VACUUM SLUG FEEDER

BACKGROUND OF THE INVENTION

1. Field of the Invention

This invention relates to packaging machinery and more particularly to forming and transporting slugs of product by use of a vacuum.

2. Description of the Related Art

Serially produced product, such as cookies or crackers, lined up standing on end, front-to-back on a conveyor belt, needs to be formed into slugs for packaging. There are several problems associated with forming such slugs. If the product is front-to-back then a means for separating the product into uniform groups known as slugs, needs to be found which does not damage the product. The slugs must then be transported to the wrapping apparatus and wrapped, while maintaining the product in its front-to-back position.

In some packaging systems a product serially transported on a first conveyor belt is collected into slugs and transferred as rows of slugs to a second conveyor belt traveling perpendicularly to the first conveyor belt. This requires a 90 degree transfer of the slug's direction. Depending on the packaging methods, the slugs may have to be transferred again to a third conveyor belt perpendicular to the second conveyor for serial alignment of the slugs as required by some packaging machinery. Multiple handlings and orientations of product complicates the packaging process and damages the product.

In order to form slugs for a continuous line of incoming product, the product has to be stopped and a barrier introduced between slugs formed. The barrier must be inserted without impacting and damaging the product. The slug of product then needs to be pushed or otherwise moved out of the way for a new slug to be formed. The slug must be maintained with all product upright while being transported to the wrapping machine.

SUMMARY OF THE INVENTION

The invention uses a vacuum to pull product forward from a line of front-to-back product being transported on a conveyor belt. The product is released from the line of continuous front-to-back product in predetermined slug lengths. The slugs are then transported by the vacuum in a vacuum chamber having dimensions slightly larger than the cross section of the product. A stopping finger is inserted before each slug in the vacuum chamber to partition the slugs and to prevent the slug from moving too fast in the vacuum. A pushing finger is inserted after each slug to push it along against positive pressure in the downstream portion of the vacuum chamber, and to push the slug after it exits the vacuum chamber. The pushing finger may be used to propel the slug to the wrapping device.

OBJECTS OF THE INVENTION

It is an object of the invention to form slugs by use of a vacuum.

It is an object of the invention to transport slugs by use of a vacuum.

It is an object of the invention to create slugs without damaging the product.

It is an object of the invention to move slugs without damaging the product.

It is an object of the invention to increase slug forming and product wrapping rates.

It is an object of the invention to provide a slug feeding apparatus having an easily adjustable slug length or count.

It is an object of the invention to form slugs of product having variable size, shape and weight.

It is an object of the invention to separate product into slugs with an in-line feed.

Other objects, advantages and novel features of the present invention will become apparent from the following detailed description of the invention when considered in conjunction with the accompanying drawings.

DESCRIPTION OF THE PREFERRED EMBODIMENTS

Figure 1:
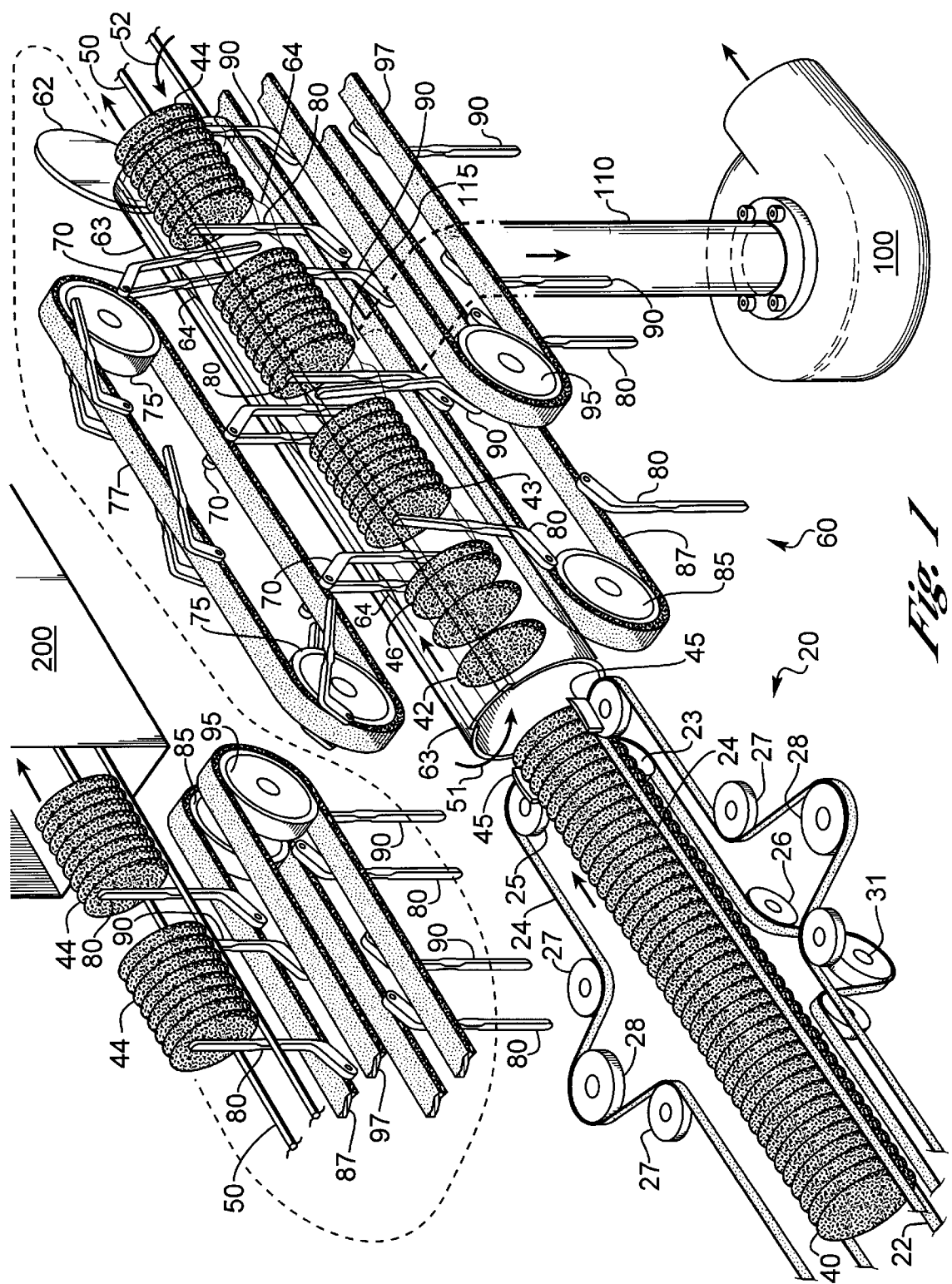
FIG. 1 is a perspective view of the Inline Vacuum Slug Feeder.
Figure 2:
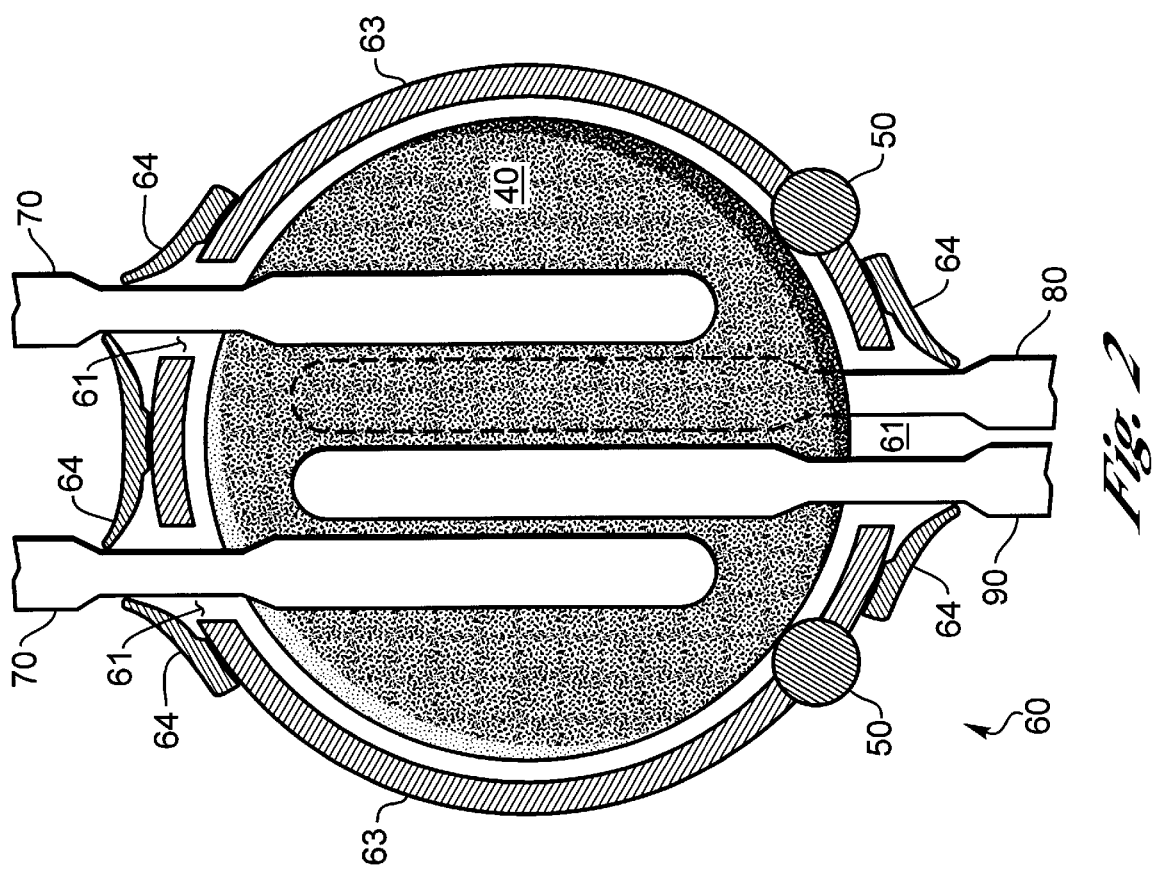
FIG. 2 is a cross section view of the Inline Vacuum Slug Feeder vacuum chamber with product.

A continuous line of cookies, crackers or other objects 40 are stacked in front-to-back fashion on an incoming conveyor belt 22 of in line slug feeder 20. The in line slug feeder 20 may have side conveyor belts 24 for securing and advancing the product 40 in an upright position. The conveyor 22 has rollers 23 on each end of its length. The conveyor belt 22 is driven by motor (not shown) in conjunction with roller 31. Conveyor belt 22 also passes over rollers 26. Side conveyor belt 24 is also driven by the motor in conjunction with pulleys 28, 27 and 25. The continuous line of product 40 is stopped from advancing at the end of the conveyor belts 22, 24 by release fingers 45 which hold the product from each side preventing the continuous line of a product 40 from being sucked into vacuum chamber 60. The release fingers 45 are spring loaded for contacting and holding the product 40. The product 40 is pushed past the release fingers 45 by the conveyor 22. After discharge from the conveyor 22 the product 40 rides on rails 50, is sucked into vacuum chamber 60 and stopped from forward advance by stop finger 70 which is attached to finger belt 77 having pulleys 75 at each end. By intermittent advancement of conveyor belt 22 by a prescribed distance, a slug of product having prescribed count is measured for release into vacuum chamber 60. The release of product into vacuum chamber 60 is timed such that stop finger 70 is in place at the end of the vacuum chamber 60 nearest the conveyor belt 22 when product item 46 is released. Thus, product item 46 is sucked into vacuum chamber 60 by air flow 51 and stopped from further rapid forward advance by stop finger 70. The suction in vacuum chamber 60 is provided by a vacuum 100, connected to vacuum chamber 60, at aperture 115, by vacuum tube 110. The position of aperture 115 is downstream of the length of a slug 44 from the mouth of the vacuum chamber 60 so that the entire slug 44 is sucked inside the vacuum chamber 60. When the entire slug 44 is in the vacuum chamber 60 the flow of product 40 is cut off by releasing fingers 45 engaging the product 40 and holding it when the belt 22 stops advancing. The next stopping finger 70 is introduced adjacent the mouth of the vacuum chamber 60 awaiting release of the next product item 46. The stop finger 70 regulates the speed of advancement of the product 40 in the vacuum chamber 60. When the first product item 46 is stopped by stop finger 70 it provides a stop for the next product item in the line. The next product item is accelerated by air flow 51 and decelerated by a cushion of compressed air between the product items as the products meet, thus limiting damage due to impact between the items.

Flaps or doors 62 on the end of the vacuum chamber 60 nearest the packaging machine 200 provides an initial air flow barrier to air flow 52 to reduce leakage at that end. Thus, initial suction is provided to advance product 40 into the vacuum chamber 60. Once the vacuum chamber 60 has product therein distal to aperture 115 the product 40 will block the air flow 52 from the distal end of the vacuum chamber 60 and the doors or flaps 62 are no longer required and may be moved out of the way.

The vacuum 100 may be adjusted for the mass of the product 40 to be advanced. For example, if the product 40 is a light and fragile cracker, the suction will not need to be as great as when the product is a sandwich type cookie having two biscuits with a cream stuffing therebetween. The sandwich cookie will have a greater mass and greater strength such that a greater suction will have to be generated by vacuum 100 to advance the product 40 into and through the vacuum chamber 60.

In an alternate embodiment, a second aperture on the opposite side of the vacuum chamber 60 from aperture 115 will be connected to another vacuum hose and pump to provide additional suction.

When the first product item 46 is released from the release fingers 45 at the mouth of vacuum chamber 60, it is sucked therein by the vacuum created by vacuum 100. The vacuum chamber wall 63 preferably provides an opening large enough for air to pass around the product 40 on its way to the aperture 115. This allows a stream of air 51 to flow from the opening of the vacuum chamber 60 and force the product 40 into the vacuum chamber 60 and move it along therein.

The product 40 is sucked into the vacuum chamber 60 at velocity in excess of the velocity of the conveyor belt 22 such that the product 40 is separated from the in line feeder 20 faster than it is advanced by the conveyor belt 22, thus avoiding a pile up of product at the end of the conveyor belt 22. The lead product item 46 is released from release finger 45 and is sucked against stop finger 70, which extends across the face of the product such that the vacuum secures the lead product item 46 squarely against the stop finger 70. The stop finger 70 must have a length and a flat surface area great enough to align the lead product unit 46 squarely while it is being sucked in the vacuum chamber 60. The stop finger 70 slows the advance of the product 40 in the vacuum chamber 60. All of the following product 40 entering the vacuum chamber 60 is squarely secured behind the previous product units 40 by dint of the vacuum in vacuum chamber 60. When the desired length of product 40 to form a slug 44 is reached, the conveyor 22 stops advancing, and release fingers 45 hold the product 40 such that no further product units 40 pass the release finger 45. The last released product 43 in the series is sucked into the vacuum chamber 60 and is squarely aligned with the product 40 immediately in front of it. With the flow of additional product temporarily cut off, a slug 44 of product is formed and is transported through the vacuum chamber 60. A pushing finger 80 is now rotated into place behind the last product item 43 in the slug 44. As the slug 44 passes the aperture 115, the pressure gradient reverses, tending to pull the advancing slug 44 back toward the aperture 115. However, pusher finger 80 will move the slug 44 past the aperture 115 and out of the vacuum chamber 60. Pushing finger 80 is attached to belt 87 and has pulleys 85 at either end of the belt 87.

In the embodiment shown, stop finger 70 is withdrawn from the vacuum chamber 60 distal of aperture 115 and replaced with lead finger 90 while the lead product unit 46 is under reverse vacuum pressure in vacuum chamber 60.

The lead finger 90 now defines one end of the slug 44 and will provide a support for the lead product 46 in the slug 44 to keep the product upright and square on rails 50 while being transported to the packaging machine 200. The lead finger 90 is attached to belt 97 having pulley 95 at each end.

In this manner the slugs 44 are formed while the product remains transported in line. No 90 degree transports of the slugs 44 are required to form the slug 44. The velocity of the product 40 is increased downstream of the conveyor belt 22 such that gaps can be formed between slugs 44 for introducing finger stops 70 and 80 without engaging or damaging the product 40.

The fingers 70, 80 and 90 extend into the vacuum chamber 60 by way of slits 61 formed in the top and bottom of the vacuum chamber 60. The slits 61 are covered by a cloth, bristle, elastomer or other pliable sealing material 64 through which fingers 70, 80 and 90 penetrate as they traverse the length of the slits 61. Material 64 covering the slits 61 in the vacuum chamber 60 reduce air leakage through the slits 61 in the vacuum chamber 60.

The length of the slugs 44 formed is easily adjusted by changing the distance by which conveyor belts 22, 24 are intermittently advanced. Changes in the slug length also require adjustments to the distances between the fingers 70 on belt 75, the fingers 80 on belt 85 and the fingers 90 on belt 95. The belts 75, 85 and 95 are driven at uniform rates relative to each other by a motor and mechanism not shown.

In an alternate embodiment, the conveyor belt 22 can be mounted on a movable carriage such that the carriage advances toward and retracts from the vacuum chamber 60 to deliver product with the conveyor belt 22 running at a constant speed.

Once out of the vacuum chamber 60, the slugs 44 may be moved 90 degrees to feed another packaging step, or to feed an alternatively located inline packaging process.

Obviously, many modifications and variations of the present invention are possible in light of the above teachings. It is therefore to be understood that, within the scope of the appended claims, the invention may be practiced otherwise than as specifically described.

What is claimed is:

1. An inline vacuum slug feeder comprising:
    a conveyor belt for moving a plurality of items, serially stacked front-to-back in line, from an intake end to a discharge end of the conveyor belt,
    a vacuum chamber adjacent to and in line with the conveyor belt discharge end, for pulling items by vacuum from the discharge end of the conveyor belt into the vacuum chamber, such that the items are serially stacked front-to-back in line as on the conveyor belt,
    a regulating means for controlling the passage of items from the discharge end of the conveyor belt to the vacuum chamber,
    a first finger inserted into and moving in the vacuum chamber, the finger inserted between the items, for regulating the velocity of the items in the vacuum chamber and for separating the plurality of items into slugs.

2. An inline vacuum slug feeder as in claim 1 having:
    an aperture in the side of the vacuum chamber,
    a tube connected to the aperture for fluidly connecting the vacuum chamber to a source of a vacuum.

3. An inline vacuum slug feeder as in claim 2 wherein:
    the aperture in the side of the vacuum chamber is located downstream from the entrance to the vacuum chamber at a distance longer than the slug length being sucked into the vacuum chamber such that the entire slug is sucked into the vacuum chamber.

4. An inline vacuum slug feeder as in claim 1 wherein:

a side conveyor belt on each side of the item moves in unison with the conveyor belt to contact the sides of the item and keep the item in an upright position as it moves.

5. An inline vacuum slug feeder as in claim 2 wherein:

a second finger is inserted into and moves in the vacuum chamber for engaging the slug on the opposite end from the first finger for keeping the slug intact and pushing the slug through the vacuum chamber beyond the aperture.

6. An inline vacuum slug feeder as in claim 5 wherein:

a third finger is inserted into and moved in the vacuum chamber adjacent the first finger such that the first finger can be withdrawn while the second and third fingers engage the front and rear of the slug for exiting the vacuum chamber and transporting the slug from the vacuum chamber to a packaging machine.

7. An inline vacuum slug feeder as in claim 1 wherein:

the regulating means for controlling the passage of items from the discharge end of the conveyor belt to the vacuum chamber comprises a pair of opposing fingers on each side of the items being conveyed, the opposing fingers located between the discharge end of the conveyor belt and the vacuum chamber, the opposing fingers holding the items from being sucked into the vacuum chamber.

8. An inline vacuum slug feeder as in claim 7 having:

a means for coordination of the opposing fingers and the conveyor belt such that when the conveyor belt stops, the opposing fingers engage the items to prevent them from being sucked into the vacuum chamber, thus providing a break in the flow of items such that slugs are created.

9. An inline vacuum slug feeder as in claim 6 wherein:

a pair of rails extend from the discharge end of the conveyor belt through the vacuum chamber and to the packaging machine for supporting the items after they leave the conveyor belt.

10. An inline vacuum slug feeder as in claim 6 having:

a slit in the vacuum chamber for admitting the fingers, and a seal on the vacuum chamber along the length of travel of the fingers for blocking loss of vacuum along the slit.

11. An inline vacuum slug feeder as in claim 2 wherein:

a door on the vacuum chamber prevents loss of vacuum until items in the vacuum chamber between the aperture and the door blocks the vacuum from escaping from the vacuum chamber.

12. An inline vacuum slug feeder as in claim 1 having:

a reciprocating carriage having the conveyor belt mounted thereon such that the conveyor belt can operate at a constant speed for delivering product to the vacuum chamber as the carriage moves toward and retreats from the vacuum chamber.

13. A process for regulating slug length and product count within a slug comprising:

moving a line of upright items with the items stacked back-to-back on a conveyor belt, sucking the items from the end of the conveyor belt into a vacuum chamber such that the items in the vacuum chamber remain in line, upright and back-to-back, stopping the linear movement of the items at the end of the conveyor belt after a known length of items have gone by, inserting a first moving finger into the vacuum chamber while the movement of items from the conveyor belt is stopped, releasing the stopped items so they can again travel from the conveyor belt into the vacuum chamber such that the finger slows the flow of items in the vacuum chamber and divides the line of items into slugs.

14. A process for regulating slug length and product count within a slug as in claim 13 further comprising:

inserting a second moving finger into the vacuum chamber to engage the slug on the opposite end of the slug from first finger and such that the second finger can push the slug out of the vacuum chamber.

15. A process for regulating slug length and product count within a slug as in claim 14 further comprising:

inserting a third moving finger into the vacuum chamber to engage the slug adjacent to the first finger and withdrawing the first finger from the vacuum chamber such that the second and third fingers contain the slug and advance it out of the vacuum chamber.

* * * * *